United States Patent
Zhou et al.

(10) Patent No.: US 8,151,283 B2
(45) Date of Patent: Apr. 3, 2012

(54) METHOD AND SYSTEM FOR PROCESSING INVOKING REQUEST IN DISTRIBUTED SYSTEM

(75) Inventors: Jian Zhou, Shenzhen (CN); Bo Peng, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 645 days.

(21) Appl. No.: 12/347,774

(22) Filed: Dec. 31, 2008

(65) Prior Publication Data

US 2009/0113461 A1    Apr. 30, 2009

Related U.S. Application Data

(63) Continuation of application No. PCT/CN2008/070535, filed on Mar. 19, 2008.

(30) Foreign Application Priority Data

Mar. 22, 2007    (CN) .......................... 2007 1 0088282

(51) Int. Cl.
  *G06F 9/44*    (2006.01)
(52) U.S. Cl. .......................... 719/330; 719/316; 719/328
(58) Field of Classification Search .................. 719/310, 719/315, 316, 318, 328, 330
  See application file for complete search history.

(56) References Cited

U.S. PATENT DOCUMENTS

| | | | |
|---|---|---|---|
| 7,136,913 B2 * | 11/2006 | Linderman | 709/223 |
| 7,325,053 B2 * | 1/2008 | Linderman | 709/223 |
| 7,444,346 B2 * | 10/2008 | Bearden et al. | 1/1 |
| 7,624,397 B1 * | 11/2009 | Washburn et al. | 719/315 |
| 7,734,756 B2 * | 6/2010 | Linderman | 709/223 |
| 2004/0039800 A1 | 2/2004 | Black et al. | |
| 2004/0226022 A1 * | 11/2004 | Prabhu | 719/315 |
| 2005/0022208 A1 | 1/2005 | Bolar et al. | |
| 2005/0268309 A1 | 12/2005 | Krishnaswamy et al. | |
| 2006/0271570 A1 * | 11/2006 | Bearden et al. | 707/100 |

FOREIGN PATENT DOCUMENTS

| | | |
|---|---|---|
| CN | 1832476 | 9/2006 |
| WO | WO-9411810 | 5/1994 |

OTHER PUBLICATIONS

Vinoski "Distributed Object Computing With CORBA", 1993, 9 pages.*
Uszok et al. "Interoperability Gateway Construction for Object-Oriented Distributed Systems", Mar. 1994, pp. 1-15.*
Orfali "The Server Side of CORBA", 1995, pp. 1-5.*
IONA Technology Ltd. "The ORBIX Architecture", 1995, 23 pages.*

* cited by examiner

*Primary Examiner* — Van Nguyen
(74) *Attorney, Agent, or Firm* — Brinks Hofer Gilson & Lione

(57) ABSTRACT

An invoking request processing method in distributed system. The method makes a judgment according to the interface performance of an invoking object, and transforming an invoking request being sent to an intermediate object into a transferring request, which makes the intermediate object only needing to perform the transferring operation for the invoking request. The actual implemental object directly returns the result to the requesting party. And an corresponding distributed system, distributed server and object implementing module are provided. The requesting party may directly obtain the implement result from the actual implemental object by launching only one invocation, which enhanced the requesting efficiency. Meanwhile the intermediate object only needs to implement the transferring interface, which simplifies the development difficulty of the intermediate object.

8 Claims, 3 Drawing Sheets

METHOD AND SYSTEM FOR PROCESSING INVOKING REQUEST IN DISTRIBUTED SYSTEM

This application is a continuation of International Application No. PCT/CN2008/070535 filed on Mar. 19, 2008, which claims priority to Chinese Patent Application No. 200710088282.5, entitled "Method for Processing Invocation Request in Distributed System, Distributed System and Server" and filed with the Chinese Patent Office on Mar. 22, 2007, both of which are incorporated herein by reference in their entireties.

FIELD OF THE INVENTION

The present invention relates to the field of distributed processing technologies and in particular to a method for processing an invocation request in a distributed system, a corresponding distributed system and a distributed server.

BACKGROUND OF THE INVENTION distributed system architecture earns increasingly wide applications along with the constant development of computer and network technologies. In a distributed invocation procedure, an invocation requester in some scenarios can not obtain a real execution object directly and instead an invocation request of the requester has to be processed with a readily accessible intermediate object (broker). For example, a coarse-grain request of the requester sometimes can be mapped to a fine-grain object with provision of an execution (that is, the invocation request of the requester is distributed to the target object with real provision of an execution) or several real execution objects can be masked with a readily accessible fixed object. The following two processing methods are typically adopted at present.

The first method generally includes the following steps.
1. The requester initiates a request to the intermediate object for obtaining an object reference;
2. The intermediate object selects a real execution object and returns the reference to the requester
3. The requester initiates a request to the real execution object in a stipulated way;
4. The real execution object returns a result to the requester.

The second method generally includes the following steps.
1. The requester initiates an invocation request to the intermediate object
2. The intermediate object proceeds with invoking a specific real execution object;
3. The real execution object returns a result to the intermediate object
4. The intermediate object returns the result to the requester.

The inventors have identified from a search during the implementation of the invention that each of the objects (including the requester, the intermediate object and the real execution object) interact over a distributed service platform in the above two methods. In the first method, one service of the requester has to be mapped to two requests, that is, the request for obtaining the object reference and the real processing request, which may result in degraded performance and increased implementation complexity. In the second method, since the intermediate object initiates the invocation of the real execution object, both the transmission of the request and the return of the response result have to be enabled through the intermediate object, which may result in a lower request efficiency; and the intermediate object has to implement the interfaces of all real execution objects, which may result in higher difficulty in development.

SUMMARY OF THE INVENTION

Embodiments of the invention provide a method for processing an invocation request in a distributed system and a distributed system and server for improved efficiency and simplified operations.

An embodiment of the invention provides a method for processing an invocation request in a distributed system for improved efficiency and simplified operations including: receiving an invocation request of a requester to a first object, in which the invocation request includes invocation information of the requester; and sending a transfer request including the invocation information of the requester to the first object in accordance with a determination of an interface capability of the first object, so that the first object transfers invocation of the requester to a second object in response to the transfer request and the second object executes the invocation and returns an execution result to the requester.

An embodiment of the invention further provides a corresponding distributed system including a distributed server, a first object execution module and a second object execution module, in which: the distributed server is adapted to receive an invocation request of a requester to the first object execution module and to send a transfer request including invocation information of the requester to the first object execution module in accordance with a determination of an interface capability of the first object execution module; the first object execution is adapted to transfer invocation of the requester to the second object execution module in response to the transfer request; and the second object execution module is adapted to execute the invocation and to return an execution result to the requester.

A distributed server includes: a request broker unit adapted to receive an invocation request of a requester to a first object, where the invocation request includes invocation information of the requester; an object adaptation unit adapted to determine that the first object can not implement an interface invoked by the requester and to generate an unimplemented interface event; and a forwarding unit adapted to obtain the unimplemented interface event from the object adaptation unit, to translate the invocation request into a transfer request including the invocation information of the requester to the first object and to send the transfer request to the first object.

An object execution module includes: a receiving unit, adapted to receive a transfer request including invocation information of a requester; and a transferring unit, adapted to transfer invocation of the requester to a second object execution module in response the transfer request.

The embodiments of the invention adopt the method in which interface capability of an invoked object is determined and an invocation request destined for an intermediate object (that is, the first object) is translated into a transfer request, so that the intermediate object only executes an operation of transferring the invocation request and a real execution object (that is, the second object) returns a result directly to a requester. Thus, the requester can obtain the execution result directly from the real execution object after initiating the invocation only once, thereby improving the request efficiency; and the intermediate object implements only a transfer interface instead of a real interface for the invoked real execution object, thereby simplifying operation and implementation.

DETAILED DESCRIPTION OF THE INVENTION

An embodiment of the invention provides a method for processing an invocation request in a distributed system in which a determination is made of the interface capability of an invoked object; an invocation request destined for an intermediate object is translated into a transfer request; the intermediate object executes an operation of transferring the invocation request, and the real execution object returns a result directly to the requester. Another embodiment of the invention further provides a distributed system and a distributed server corresponding to the above method for processing an invocation request.

Figure 1:
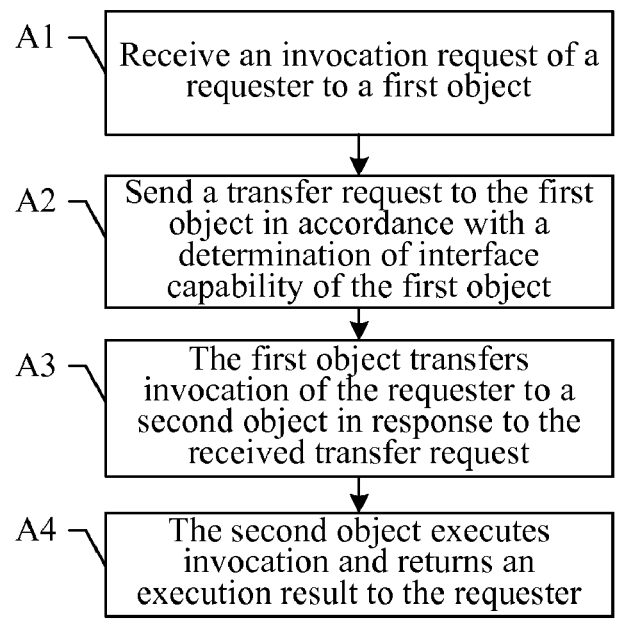
FIG. 1 is a schematic flow diagram of the method for processing an invocation request in a distributed system according to an embodiment of the invention.

Referring to FIG. 1, a schematic flow diagram of the method for processing an invocation request in a distributed system is provided, which includes the following steps.

The step A1 is to receive an invocation request of a requester to a first object, in which the request includes invocation information of the requester;

In the embodiment of the invention, interaction between objects is provided, that is, the service platform over which the objects exchanging information can be various interface-based distributed system servers, including Common Object Request Broker Architecture (CORBA) server, Simple Object Access Protocol (SOAP) server, a Remote Method Invocation (RMI) server, and the like, where the objects as referred to include the requester, the first object and the second object.

The step A2 is to send a transfer request including the invocation information of the requester to the first object in accordance with the determination of the interface capability of the requested first object;

The distributed server can determine that the first object acts as an intermediate object in accordance with whether the requested first object can implement an invoked interface or provide a transfer interface, thereby translating the invocation request of the requester into a specific request, that is, the transfer request, to the invoked first object. The transfer request can be made by the distributed server invoking the transfer interface of the intermediate object, which may be a universal transfer interface or a transfer interface provided dedicatedly for the specific intermediate object.

In the step A3, the first object transfers invocation of the requester to the second object in response to the received transfer request;

Here, the first object may be a broker of several real objects or an executor mapping a coarse-grain request to a fine-grain object, which is capable of determining a real executor of the invocation request, that is, the second object. In the embodiment of the invention, it is sufficient for the first object to implement the transfer interface to the second object via which the invocation of the requester is transferred to a corresponding real execution object instead of implementing all real interfaces to the second object.

In the step A4, the second object executes the invocation and returns an execution result to the requester.

Since the first object only transfers the invocation request to the second object and the invocation requester is still the initial requester instead of the first object enabling the invocation transfer, the second object can return the execution result directly to the requester at the end of the execution without transferring by the first object.

A preferred method based upon the first embodiment will be provided on the basis of the capability of generating a standard system abnormality in a distributed system in the prior art.

Figure 2:
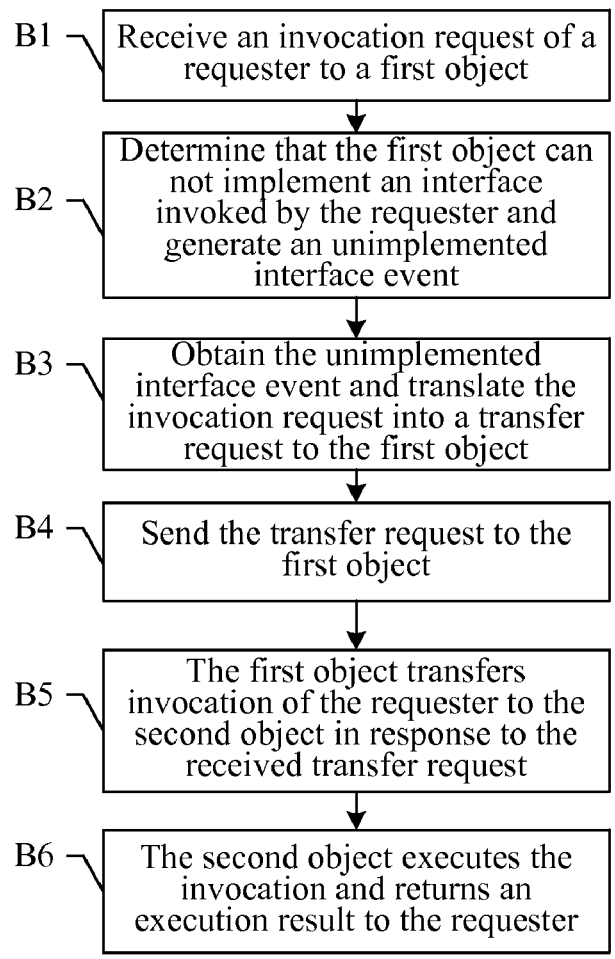
FIG. 2 is a schematic flow diagram of the method for processing an invocation request in a distributed system according to another embodiment of the invention.

A method for processing an invocation request in a distributed system as illustrated in FIG. 2 includes the following steps.

The step B1 is to receive an invocation request of a requester to the first object;

In the embodiment of the invention, interaction between objects is provided, that is, the service platform over which the objects exchanging information can be various interface-based distributed system servers, including a CORBA server, an SOAP server, an RMI server, and the like, where the objects as referred to include the requester, the first object and the second object.

The step B2 is to determine that the requested first object can not implement an interface invoked by the requester and to generate an unimplemented interface event;

A general distributed server, e.g., a CORBA server, typically can generate a corresponding system abnormal event when an invoked object can not implement an invoked interface, and the embodiment makes use of the capability of the server to generate "unimplemented interface abnormality" to trigger translation of the invocation request.

Practically, if it is determined that the first object can implement the interface invoked in the request, then this relates to a normal object invocation which can be processed as typically in the prior art and will not be described here.

The step B3 is to obtain the unimplemented interface event and to translate the invocation request into a transfer request to the first object;

The server can submit the generated unimplemented interface event to an additional corresponding component for processing; and for proper invocation transfer, it is possible to further determine whether the first object provides a transfer interface after obtaining the unimplemented interface event, and if so, then the invocation request is translated into the transfer request; otherwise it indicates that the first object is not an intermediate object capable of implementing the invocation transfer, and the system abnormal event can be processed as in the prior art, for example, error information, and the like, can be returned to the requester.

The step B4 is to send the transfer request to the first object;

In the step B5, the first object transfers invocation of the requester to the second object in response to the received transfer request;

In the step B6, the second object executes the invocation and returns an execution result to the requester.

Figure 3:
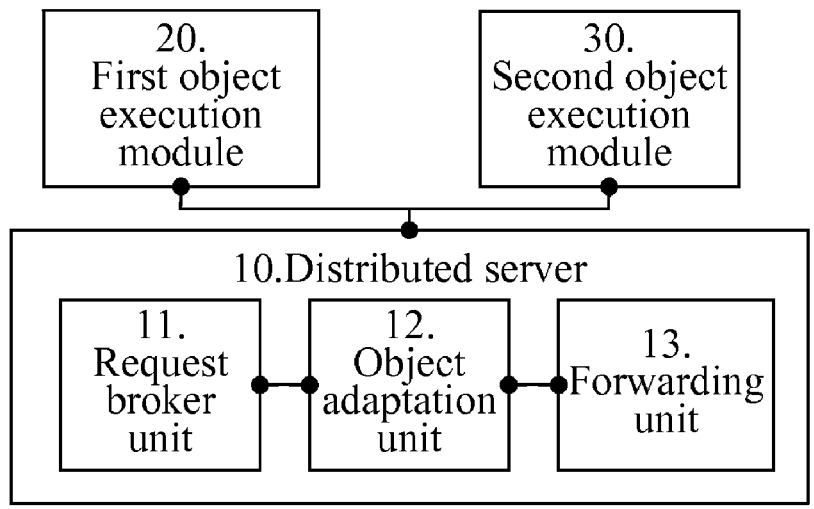
FIG. 3 is a schematic diagram of a logic structure of the distributed system according to an embodiment of the invention.

As illustrated in FIG. 3, a distributed system includes a distributed server 10, a first object execution module 20 and a second object execution module 30;

The distributed server 10 is adapted to receive an invocation request of a requester to the first object execution module 20 and to send a transfer request including invocation information of the requester to the first object execution module 20 in accordance with the determination of interface capability of the first object execution module 20;

The first object execution module 20 is adapted to transfer invocation of the requester to the second object execution module 30 in response to the transfer request sent from the distributed server 10;

The second object execution module 30 is adapted to execute the invocation and to return an execution result to the requester.

The distributed server 10 in the embodiment can be structured as including a request broker unit 11, an object adaptation unit 12 and a forwarding unit 13, in which:

The request broker unit 11 is adapted to receive the invocation request of the requester to the first object execution module 20;

The object adaptation unit 12 is adapted to determine that the first object execution module 20 can not implement an interface invoked by the requester after the request broker unit 11 receives the invocation request to the first object execution module 20 and to generate an unimplemented interface event.

The forwarding unit 13 is adapted to obtain the unimplemented interface event submitted from the object adaptation unit 12, to translate the invocation request into the transfer request to the first object execution module 20 and to send the transfer request to the first object execution module 20.

With the above structure, the distributed server in the embodiment can be implemented with simple addition of the forwarding unit to an existing distributed server.

Figure 4:
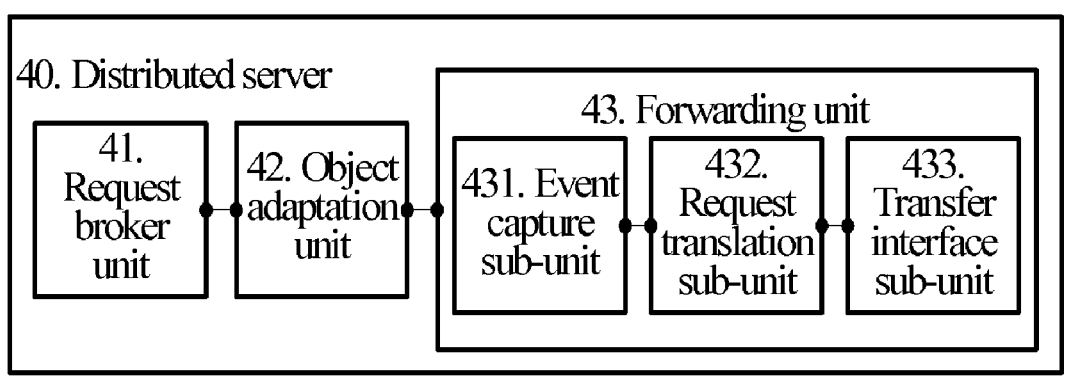
FIG. 4 is a schematic diagram of a logic structure of the distributed server according to an embodiment of the invention.

As illustrated in FIG. 4, a distributed server 40 includes a request broker unit 41, an object adaptation unit 42 and a forwarding unit 43, in which:

the request broker unit 41 is adapted to receive an invocation request of a requester to a first object, in which the invocation request including invocation information of the requester;

the object adaptation unit 42 is adapted to determine that the first object can not implement an interface invoked by the requester after the request broker unit 41 receives the invocation request to the first object and to generate an unimplemented interface event; and the forwarding unit 43 is adapted to obtain the unimplemented interface event submitted from the object adaptation unit 42, to translate the invocation request into a transfer request including the invocation information of the requester to the first object and to send the transfer request to the first object.

The forwarding unit 43 in the embodiment can be structured as including a event capture sub-unit 431, a request translation sub-unit 432 and a transfer interface sub-unit 433, in which:

the event capture sub-unit 431 is adapted to obtain the unimplemented interface event;

the request translation sub-unit 432 is adapted to determine whether the first object can provide a transfer interface after the event capture sub-unit 431 obtains the unimplemented interface event and if so, then to translate the invocation request into the transfer request to the first object; and the transfer interface sub-unit 433 is adapted to send the transfer request translated by the request translation sub-unit 432 to the first object.

An object execution module includes a receiving unit and a transferring unit, in which:

the receiving unit is adapted to receive a transfer request including invocation information of a requester; and the transferring unit is adapted to transfer invocation of the requester to a second object execution module in response to the transfer request.

The distributed server in the embodiment can be applied in the above distributed system.

Figure 5:
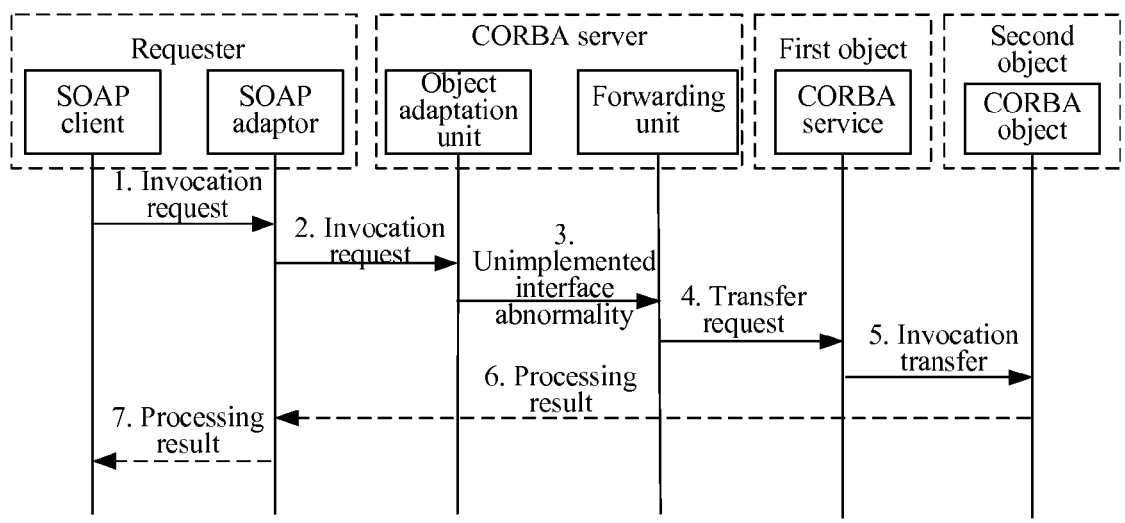
FIG. 5 is a schematic flow diagram of a specific application of the method for processing an invocation request according to a further embodiment of the invention.

A specific request processing flow will be provided according to an embodiment of the invention in an example where a requester is an SOAP client making an SOAP request to a CORBA-based distributed system through an SOAP protocol adaptor (SOAP adaptor as simply referred to below), and the SOAP adaptor executes protocol translation from the SOAP request to a CORBA request. In the embodiment, the SOAP protocol is a service-based protocol while the CORBA is an object-based protocol, and a service is a coarse-grain execution entity while an object is a fine-grain execution entity. Therefore, different granularities typically shall be mapped to each other during execution of the SOAP request to a real CORBA object. A CORBA service in the embodiment, that is, the first object, is capable of mapping a coarse-grain SOAP request to a fine-grain CORBA object, and the SOAP client initiates the request thereto; and a CORBA object, that is, the second object, implements an invoked interface in the request to provide the capability of a real execution. As illustrated in FIG. 5, a flow of processing the request includes the following steps:

1. The SOAP client initiates an invocation request to the CORBA service through the SOAP adaptor;

2. The SOAP adaptor submits the invocation request to the CORBA service through the CORBA server;

3. The object adaptation unit discovers during an interface search that the CORBA service can not implement the requested interface and submits "unimplemented interface abnormality" to the forwarding unit;

4. The forwarding unit discovers that the CORBA service is capable of transferring and then invokes the transfer interface of the service to submit the transfer request including the invocation request information of the client to the CORBA service;

5. The CORBA service transfers and submits client invocation to the target CORBA object really capable of processing the request in response to the transfer request and the invocation request information of the client contained therein;

6. The CORBA object processes the request and returns a result to the SOAP adaptor;

7. The SOAP adaptor returns the result to the SOAP client.

As apparent from the above embodiments, the embodiments of the invention adopt the method in which the interface capability of an invoked object is determined and an invocation request destined for an intermediate object is translated into a transfer request, so that the intermediate object only executes an operation of transferring the invocation request and a real execution object returns a result directly to a requester. Thus, the requester can obtain the execution result directly from the real execution object after initiating the invocation only once, thereby improving the request efficiency; and the intermediate object implements only a transfer interface instead of a real interface to the invoked real execution object, thereby simplifying development of the intermediate object.

The method for processing an invocation request in a distributed system, the distributed system and the distributed server according to the embodiments of the invention have been described in details as above, the principle and embodiments of the invention have been set forth by way of specific examples, and the above descriptions of the embodiments are intended merely to facilitate understanding of the inventive method. Those having ordinary skill in the art can modify the embodiments and application scopes without departing from the spirit of the invention. Accordingly, the specification shall not be taken in any way of limiting the scope of the invention as defined in the appended claims.

What is claimed is:

1. A method for processing an invocation request in a distributed system having a first object execution module and a second object execution module, the method comprising:
   receiving, by the distributed server, an invocation request of a requester to the first object execution module and to send a transfer request comprising invocation information of the requester to the first object execution module in accordance with a determination of an interface capability of the first object execution module;
   transferring, by the first object execution module, invocation of the requester to the second object execution module in response to the transfer request; and
   the second object execution module is configured to execute the invocation and to return an execution result to the requester;
   receiving, by a request broker unit, the invocation request of the requester to the first object execution module;
   determining, by an object adaptation unit, that the first object execution module is not capable of implementing an interface invoked by the requester and to generate an unimplemented interface event; and
   obtaining, by a forwarding unit, the unimplemented interface event from the object adaptation unit, to translate the invocation request into the transfer request to the first object execution module and to send the transfer request to the first object execution module,
   wherein the forwarding unit comprises:
      an event capture sub-unit configured to obtain the unimplemented interface event;
      a request translation sub-unit configured to determine whether the first object execution module is capable of providing a transfer interface after obtaining the unimplemented interface event from the event capture sub-unit, and if so, then to translate the invocation request into the transfer request to the first object execution module; and
      a transfer interface sub-unit configured to send the transfer request obtained from the request translation sub-unit to the first object execution module.

2. The method for processing the invocation request according to claim 1, wherein the distributed server is a Common Object Request Broker Architecture (CORBA) server.

3. The method for processing the invocation request according to claim 1, wherein the distributed server is a Simple Object Access Protocol (SOAP) server.

4. The method for processing the invocation request according to claim 1, wherein the distributed server is a Remote Method Invocation (RMI) server.

5. A distributed system, comprising a distributed server having a processor, a first object execution module and a second object execution module, wherein:
   the distributed server is configured to receive an invocation request of a requester to the first object execution module and to send a transfer request comprising invocation information of the requester to the first object execution module in accordance with a determination of an interface capability of the first object execution module;
   the first object execution module is configured to transfer invocation of the requester to the second object execution module in response to the transfer request;
   the second object execution module is configured to execute the invocation and to return an execution result to the requester;
   a request broker unit configured to receive the invocation request of the requester to the first object execution module;
   an object adaptation unit configured to determine that the first object execution module is not capable of implementing an interface invoked by the requester and to generate an unimplemented interface event; and
   a forwarding unit configured to obtain the unimplemented interface event from the object adaptation unit, to translate the invocation request into the transfer request to the first object execution module and to send the transfer request to the first object execution module,
   wherein the forwarding unit comprises:
      an event capture sub-unit configured to obtain the unimplemented interface event;
      a request translation sub-unit configured to determine whether the first object execution module is capable of providing a transfer interface after obtaining the unimplemented interface event from the event capture sub-unit, and if so, then to translate the invocation request into the transfer request to the first object execution module; and
      a transfer interface sub-unit configured to send the transfer request obtained from the request translation sub-unit to the first object execution module.

6. The distributed system according to claim 5, wherein the distributed server is a Common Object Request Broker Architecture (CORBA) server.

7. The distributed system according to claim 5, wherein the distributed server is a Simple Object Access Protocol (SOAP) server.

8. The distributed system according to claim 5, wherein the distributed server is a Remote Method Invocation (RMI) server.

* * * * *